(12) United States Patent
Yokokura

(10) Patent No.: US 8,214,695 B2
(45) Date of Patent: *Jul. 3, 2012

(54) INFORMATION PROCESSING APPARATUS AND INFORMATION NOTIFICATION METHOD THEREFOR, AND CONTROL PROGRAM

(75) Inventor: Hidenori Yokokura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/539,335

(22) Filed: Aug. 11, 2009

(65) Prior Publication Data

US 2009/0300432 A1  Dec. 3, 2009

Related U.S. Application Data

(63) Continuation of application No. 11/198,964, filed on Aug. 8, 2005, now Pat. No. 7,653,841.

(30) Foreign Application Priority Data

Aug. 6, 2004 (JP) .................................. 2004-231243
Jun. 3, 2005 (JP) .................................. 2005-164585

(51) Int. Cl.
 *G06F 11/00* (2006.01)
(52) U.S. Cl. ......................................................... 714/48
(58) Field of Classification Search ........................ None
See application file for complete search history.

(56) References Cited

U.S. PATENT DOCUMENTS

| 5,491,788 | A | 2/1996 | Cepulis et al. |
| 5,620,264 | A | 4/1997 | Kagita |
| 6,073,085 | A | 6/2000 | Wiley et al. |
| 6,122,756 | A * | 9/2000 | Baxter et al. ................... 714/30 |
| 6,817,792 | B2 | 11/2004 | Parry |
| 7,017,085 | B2 * | 3/2006 | Braun ............................. 714/47 |
| 7,191,367 | B2 | 3/2007 | Ito et al. |
| 7,266,734 | B2 | 9/2007 | Chavez et al. |
| 7,328,376 | B2 * | 2/2008 | McGuire et al. ................ 714/48 |
| 2001/0044841 | A1 * | 11/2001 | Kosugi et al. .................. 709/223 |
| 2002/0080383 | A1 | 6/2002 | Nishikawa |
| 2002/0138612 | A1 | 9/2002 | Sekizawa |

(Continued)

FOREIGN PATENT DOCUMENTS

EP   0 598 504 A2  A2   5/1994

(Continued)

OTHER PUBLICATIONS

Thomas R. Cikoski, Simple Network Management Protocol FAQ. Jul. 2, 2003.

(Continued)

*Primary Examiner* — Gabriel Chu
(74) *Attorney, Agent, or Firm* — Rossi, Kimms & McDowell LLP

(57) ABSTRACT

To enable the host server side to be aware of the recovery of an error when the error is recovered by the user's power off/on operation, the most recent state regarding occurrences of errors at printer 16 (steps S61 and S62) is stored in the backup RAM 12*a* each time a status change occurs (steps S63 and S64), and when an user performs a power off/on operation and a printing device is re-activated (step S65), if a most recent state at the time of the previous activation was in a state of service call error occurrence (step S66), the current status of the printer 16 is then sent (steps S68 and S69).

12 Claims, 7 Drawing Sheets

U.S. PATENT DOCUMENTS

| | | |
|---|---|---|
| 2002/0176532 A1 | 11/2002 | McClelland et al. |
| 2003/0070115 A1* | 4/2003 | Nguyen et al. ............ 714/23 |
| 2003/0105995 A1* | 6/2003 | Schroath et al. ............ 714/48 |
| 2003/0112452 A1 | 6/2003 | McIntyre |
| 2004/0003076 A1 | 1/2004 | Hishimoto |
| 2004/0078683 A1 | 4/2004 | Buia et al. |
| 2005/0229020 A1* | 10/2005 | Goodman et al. ............ 714/2 |
| 2006/0168569 A1 | 7/2006 | Smith et al. |
| 2008/0250277 A1 | 10/2008 | Yoshida et al. |

FOREIGN PATENT DOCUMENTS

| | | |
|---|---|---|
| JP | 56-108151 A | 8/1981 |
| JP | 6-332581 A | 12/1994 |
| JP | 7-323643 A | 12/1995 |
| JP | 9-212430 A | 8/1997 |
| JP | 9-321931 A | 12/1997 |
| JP | 2001-209275 A | 8/2001 |
| JP | 2004-005170 A | 1/2004 |

OTHER PUBLICATIONS

O'Connell et al.; "Using SOAP to Clean up Configuration Management"; Proceedings of the 25th Annual International Computer Software and Applications Conference; COMPSAC 2001; Chicago, IL; Oct. 8-12, 2001; Annual International Computer Software and Applications Conference, Los Alamitos, CA; IEEE Comp. Soc, US, vol. Conf. 25, Oct. 8, 2001; pp. 555-560; XP010565474; ISBN:0-7695-1372-7.

* cited by examiner

FIG. 4

```
<env:Envelope xmls:env="http://schemas.xmlsoap.org/soap/envelope/"
env:encodingStyle="http://schemas.xmlsoap.org/soap/encoding/">
  <env:Body>
    <ns:em_postAlert xmlns:ns="rdsgw">
     <client>
       <id>100</id>
       <type>type A</type>
       <appVersion>1.00</appVersion>
     </client>
     <alertList>
       <device>
         <mac>85:33:f2:2a</mac>
         <ip>192.168.0.1</ip>
         <serialNumber>serial:99345567</serialNumber>
         <productName>real new device..</productName>
         <type>type A</type>
       </device>
       <alert>
         <code>1234</code>
         <majorstatus>5678</majorstatus>
         <opmessage>this is opmessage..</opmessage>
         <timeStamp>2003/09/04 19:41 47</timeStamp>
       </alert>
       <alert>
         <code>3456</code>
         <majorstatus>8765</majorstatus>
         <opmessage>this is opmessage..</opmessage>
         <timeStamp>2003/09/04 19:41 47</timeStamp>
       </alert>
     </alertList>
     <counterList>
       <id>11</id>
       <value>10</value>
     </counterList>
    </ns:em_postAlert>
  </env:Body>
</env:Envelope>
```

401 (entire message)
402 (first alert)
403 (second alert)

FIG. 5

```
<env:Envelope xmls:env="http://schemas.xmlsoap.org/soap/envelope/"
env:encodingStyle="http://schemas.xmlsoap.org/soap/encoding/">
  <env:Body>
    <ns:em_postAlert xmlns:ns="rdsgw">
     <client>
       <id>100</id>
       <type>type A</type>
       <appVersion>1.00</appVersion>
     </client>
     <alertList>
      <device>
        <mac>85:33:f2:2a</mac>
        <ip>192.168.0.1</ip>
        <serialNumber>serial:99345567</serialNumber>
        <productName>real new device..</productName>
        <type>type A</type>
      </device>
      <alert>
        <code>0</code>
        <majorstatus>0</majorstatus>
        <opmessage></opmessage>
        <timeStamp>2003/09/04 19:41 47</timeStamp>
      </alert>
     </alertList>
     <counterList>
      <id>11</id>
      <value>10</value>
     </counterList>
    </ns:em_postAlert>
  </env:Body>
</env:Envelope>
```

501 — (client and alertList/device section)

502 — (alert section)

FIG. 6

```
<SOAP-ENV:Envelope xmlns:SOAP-ENV="http://schemas.xmlsoap.org/soap/envelope/"
 xmlns:xsi="http://www.w3.org/2001/XMLSchema-instance" xmlns:xsd="http://
www.w3.org/2001/XMLSchema">
 SOAP-ENV:Body>
 <ns:em_postAlertRespose xmlns:ns1="rdsgw"SOAP-ENV:encodingStyle="http://
schemas.xmlsaop.org/soap/encoding/"/>
 <result>OK</result>
 </ns:em_postAlertResponse>

<SOAP-ENV:Body>
</SOAP-ENV:Envelope>
```

INFORMATION PROCESSING APPARATUS AND INFORMATION NOTIFICATION METHOD THEREFOR, AND CONTROL PROGRAM

This is a continuation of and claims priority from U.S. patent application Ser. No. 11/198,964 filed Aug. 8, 2005, the content of which is incorporated herein by reference.

BACKGROUND OF THE INVENTION

1. Field of the Invention

The present invention relates to an information processing apparatus and an information notification method thereof which notifies external devices of information of failures and the like occurring at image creation devices such as printers, and a control program for executing the information notification method.

2. Related Background Art

Conventionally, in image creation devices such as printers, when an error requiring repair by a service personnel (service call error) occurs, systems are known wherein the service call error information is sent via a network to a host server at a service center of the manufacturer or distributor, and the service center side responds to such errors by dispatching service personnel to repair the image creation device at which the service call error occurred.

In addition, examples of methods of coping with errors occurring in devices such as image creation devices are as provided below.
(1) Jam information, and history information for ten most recent jams for locations of recurring jams, are received from the image creation device to determine whether or not a visit by a service personnel is necessary (see Japanese Patent Application Laid-Open No. H09-321931).
(2) Upon occurrence of internal error, power is shut off after a state information of the error occurrence is stored in a shift register, and the error status is displayed when power is turned back on (see Japanese Patent Application Laid-Open No. S56-108151).
(3) Flags are checked upon power-on to see whether or not a shutdown was a result of continuous errors occurring within a predetermined amount of time, and if so, the device is activated in an error occurrence state corresponding to a stored error type information (see Japanese Patent Application Laid-Open No. H06-332581).

The devices disclosed in these patent literatures can also formulate a system similar to the above-described system wherein error information is sent to a host server via a network upon occurrence of error.

However, the above-described conventional systems had the following problems.

For instance, when a service call error occurs at a device, after the service call error information is notified to the host server, a user may attempt recovery from the error by shutting the power of the device down and then turning it back on (hereinafter referred to as "power off/on operation"). When the error of the device is recovered and a normal status is obtained by such power off/on operation, conventional systems were configured so as to not notify the host server accordingly since it no longer constituted a state of error occurrence.

However, as a result, since the service center side is unaware of the fact that the service call error had been recovered, problems such as erroneously contacting the user or dispatching a service personnel exist.

When a service call error is restored by, for instance, a power off/on operation by a user, even when the device has a normal status, it is desirable that the host server is notified of the normal status when necessary.

SUMMARY OF THE INVENTION

Accordingly, the present invention is conceived as a response to the above-described disadvantages of the conventional art.

According to one aspect of the present invention, preferably, an information processing apparatus, comprising communication means which notifies an external device of information of an image creation device, and detection means which detects occurrences of failures at the image creation device, is characterized in that the information processing apparatus further comprises storage means which stores a history of occurrences of failures detected by the detection means and configured so that the stored contents are not deleted by an initialization process executed upon activation, and control means which makes the communication means perform status notification to the external device when a history of failure occurrences is read, even when a failure occurrence is not detected by the detection means upon activation.

When a failure occurring at the image creation device is recovered by an activation of the image creation device, it is now possible to notify an external device side of the recovery of the failure of the image creation device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing an example of a packet data sent upon error occurrence in accordance with an embodiment of the present invention;

FIG. 5 is a diagram showing an example of a packet data sent upon notification of normal return of an error in accordance with an embodiment of the present invention;

FIG. 6 is a diagram showing an example of a response to an error notification or a notification of a normal return in accordance with an embodiment of the present invention.

DETAILED DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

A preferred embodiment of an information processing apparatus and an information notification method thereof, and a control program will be described with reference to the drawings. The information processing apparatus of this embodiment can be applied for instance to printing devices.

[Configuration of Printing Device]

Figure 1:
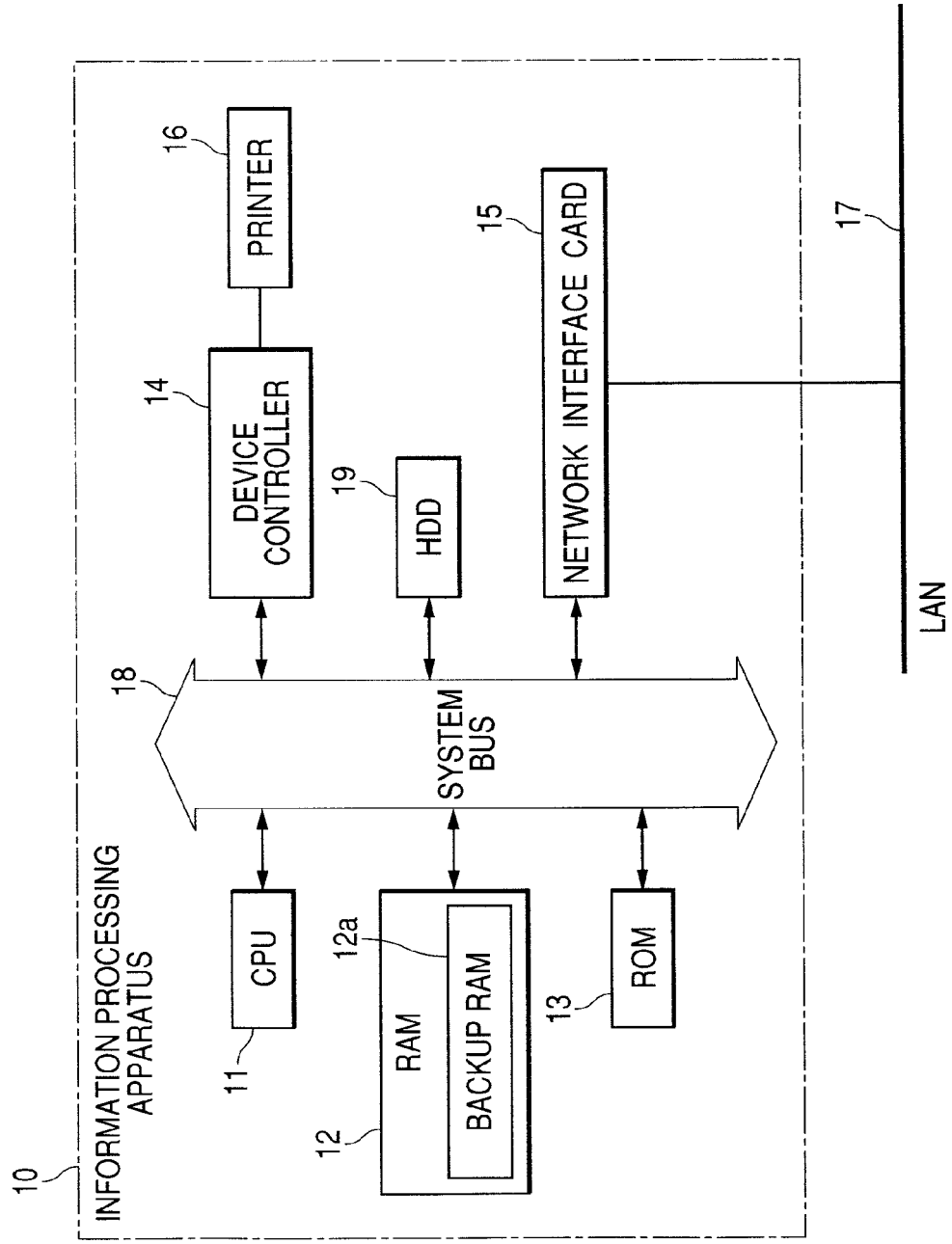
FIG. 1 is a diagram showing an internal configuration of a printing device which includes an information processing apparatus in accordance with an embodiment of the present invention.

FIG. 1 is a diagram showing an internal configuration of a printing device which includes an information processing apparatus in accordance with an embodiment of the present invention.

This printing device comprises an information processing apparatus 10, and a printer 16 which is a device. Various image creation devices such as a copying machine, a digital multifunction device, a facsimile, a laser printer, an inkjet printer and a scanner can be used as the printing device.

The information processing apparatus 10 comprises a CPU 11 which executes programs (including a program which carries out the below-mentioned processing of FIG. 3) stored in a ROM 13. In order to perform network control and printer control, the CPU 11 comprehensively controls each device connected to a system bus 17. A RAM 12, the ROM 13, a device controller (DVC) 14, a network interface card (NIC) 15 and a hard disk device (HDD) 19 is connected to the system bus 17.

In addition to the RAM 12 which functions as a main memory and a work area etc. of the CPU 11, also configured is a backup RAM 12*a* which has a backup battery and is capable of storing counter information (numbers of copies made for each paper size, number of times documents read in, number of times applications used etc.), system information and status information (including status flags) even when power is turned off.

Information stored in this backup RAM 12*a* is configured so that the stored contents are not erased even when the device's power is turned back on from off and an initialization process is performed during activation. Moreover, the storage means is not restricted to a backup RAM, but a flash memory and other embodiments can be used instead, as long as such storage means have nonvolatile attributes.

The device controller (DVC) 14 controls the printer 16, and the network interface card (NIC) 15 exchanges data with an external network device or a personal computer (PC) in a duplex operation via an intranet LAN 17. The hard disk device (HDD) 19 functions as an external storage device, and in addition to storing image data etc., it can also store the above-described counter information, system information and status information in place of the backup RAM 12*a*. The CPU 11 performs the process of storing image data to storage media such as the hard disk device (HDD) 19.

[Overall Configuration of the Network System]

Figure 2:
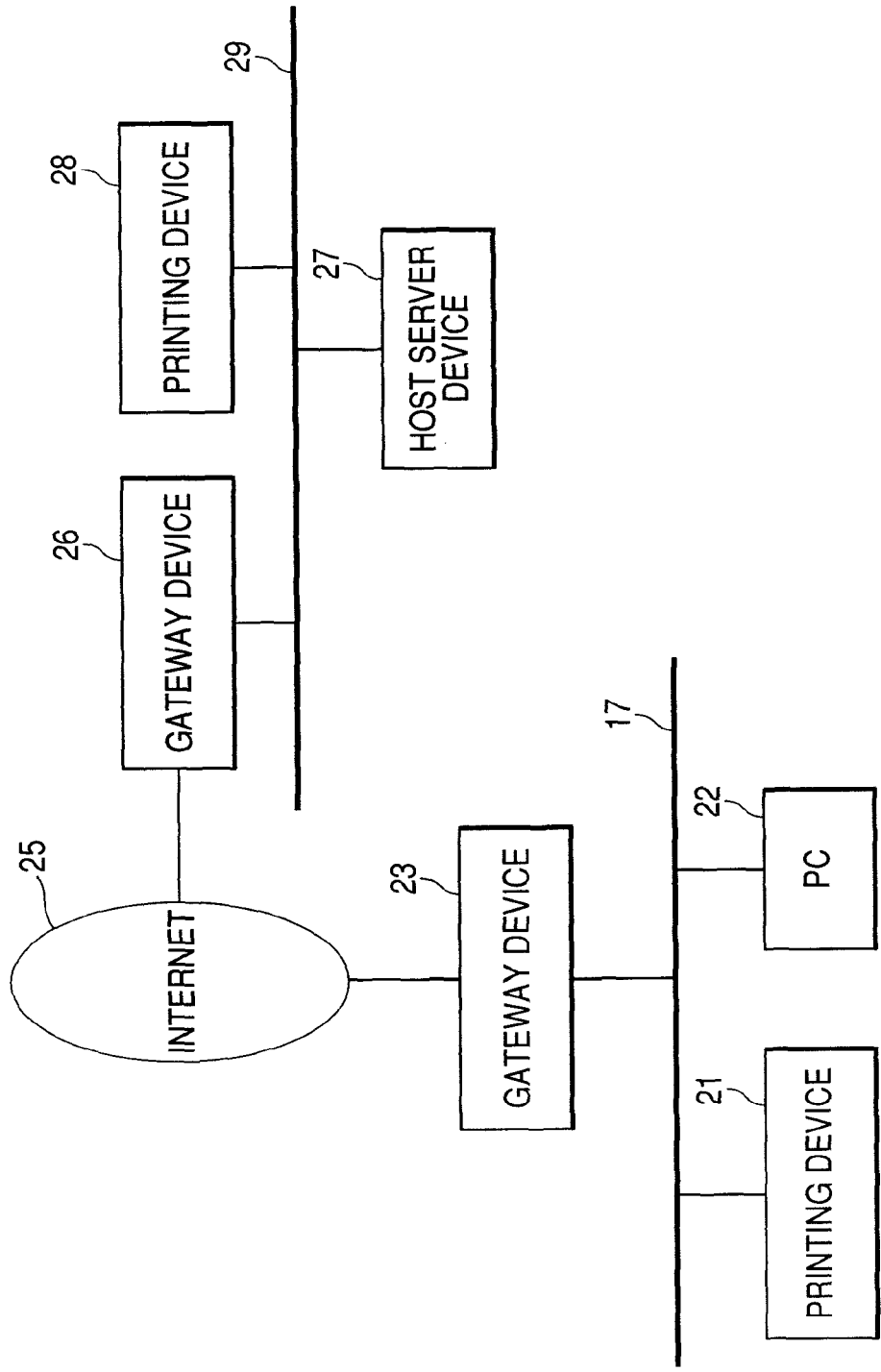
FIG. 2 is a block diagram illustrating a configuration example of a network system which includes the printing device shown in FIG. 1.

FIG. 2 is a block diagram illustrating a configuration example of a network system which includes the printing device shown in FIG. 1. Incidentally, for this network system, a network based on, for instance, HTTP (Hypertext Transfer Protocol) is assumed.

In FIG. 2, reference numeral 21 denotes the printing device shown in FIG. 1 which sends device information such as counter information or error information to a host server device 27 via the Internet 25 on either a regular or a nonregular basis.

The personal computer (PC) 22 is capable of communicating with the printing device 21 via the intranet LAN 17, and network printing is achieved by sending out a print job to the printing device 21. The gateway devices 23 and 26 function as a firewall during connection to the Internet 25.

A printing device 28 connected to the intranet LAN 29 has the same configuration as the printing device 21 shown in FIG. 1, and besides being used for network printing, it sends device information to the host server device 27. The host server device 27 is connected to the intranet LAN 29.

Incidentally, the number of PCs or printing devices may differ from those shown in FIG. 2.

[Operation of Printing Device in Accordance with an Embodiment of the Present Invention]

Figure 7:
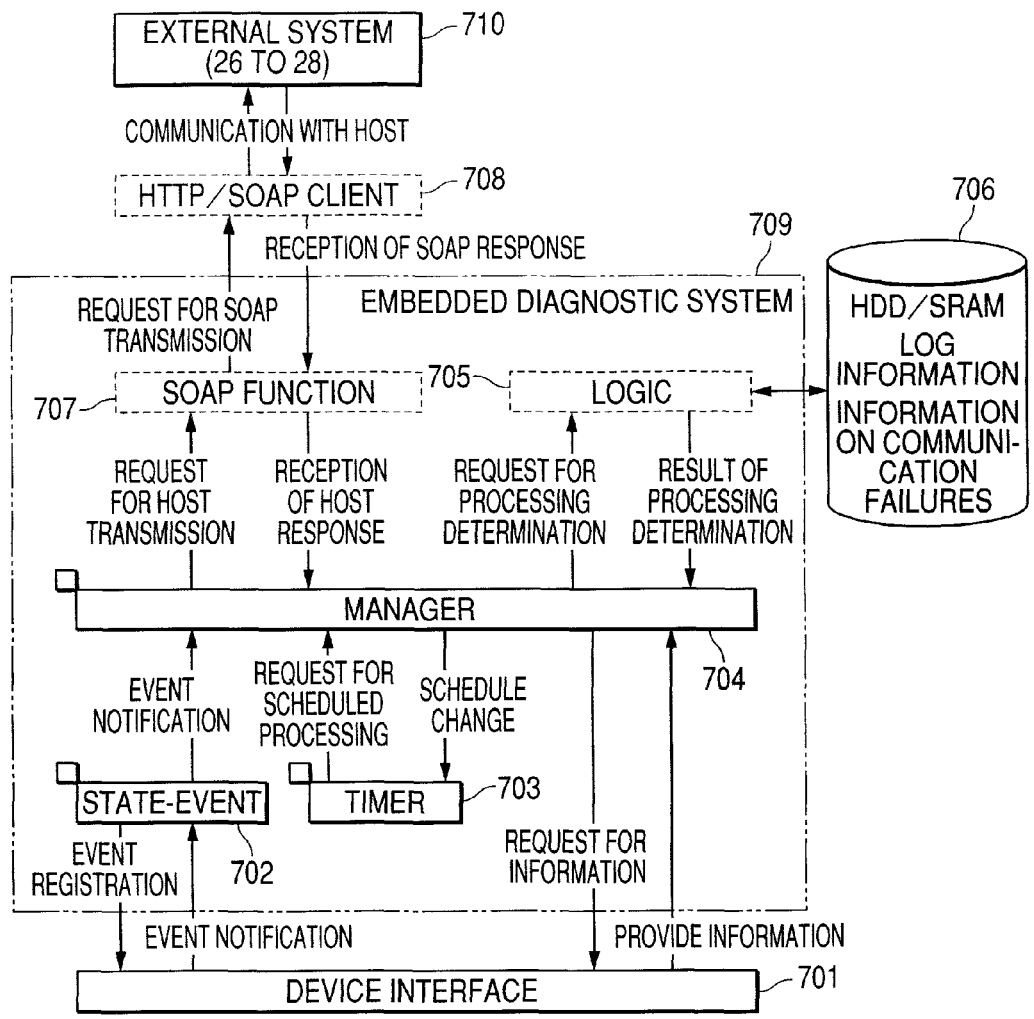
FIG. 7 is a diagram showing a module configuration in accordance with an embodiment of the present invention.

FIG. 7 is a block diagram showing software modules of the printing device 21 which is capable of communicating with an external system on the host server device 27 side. In FIG. 7, the reference numerals 701 through 709 correspond to the software modules of the printing device 21 side.

A device interface 701 is an interface with the device controller 14 and printer 16 shown in FIG. 1. Image creation device status including error (also referred to as "failure") detected at printer 16 is notified via the device interface 701. While the error may include the status of print jobs accumulated at the image creation device, for now, it is mainly assumed that the error is an image creation device failure. It is also assumed that such image creation device failures include service call errors such as hard disk errors or pay counter errors, errors such as paper jams, errors such as toner low and other warnings, an opened door, and a paper overload of a catch tray.

A state-event module 702 notifies a manager 704 of an error information list (error information of multiple types) received from the device interface 701. The error information list notified by the device interface 701 is based on the status of the image creation device detected by the various sensors at printer 16. This error information list changes over time, and therefore is categorized as variable information.

Figure 3:
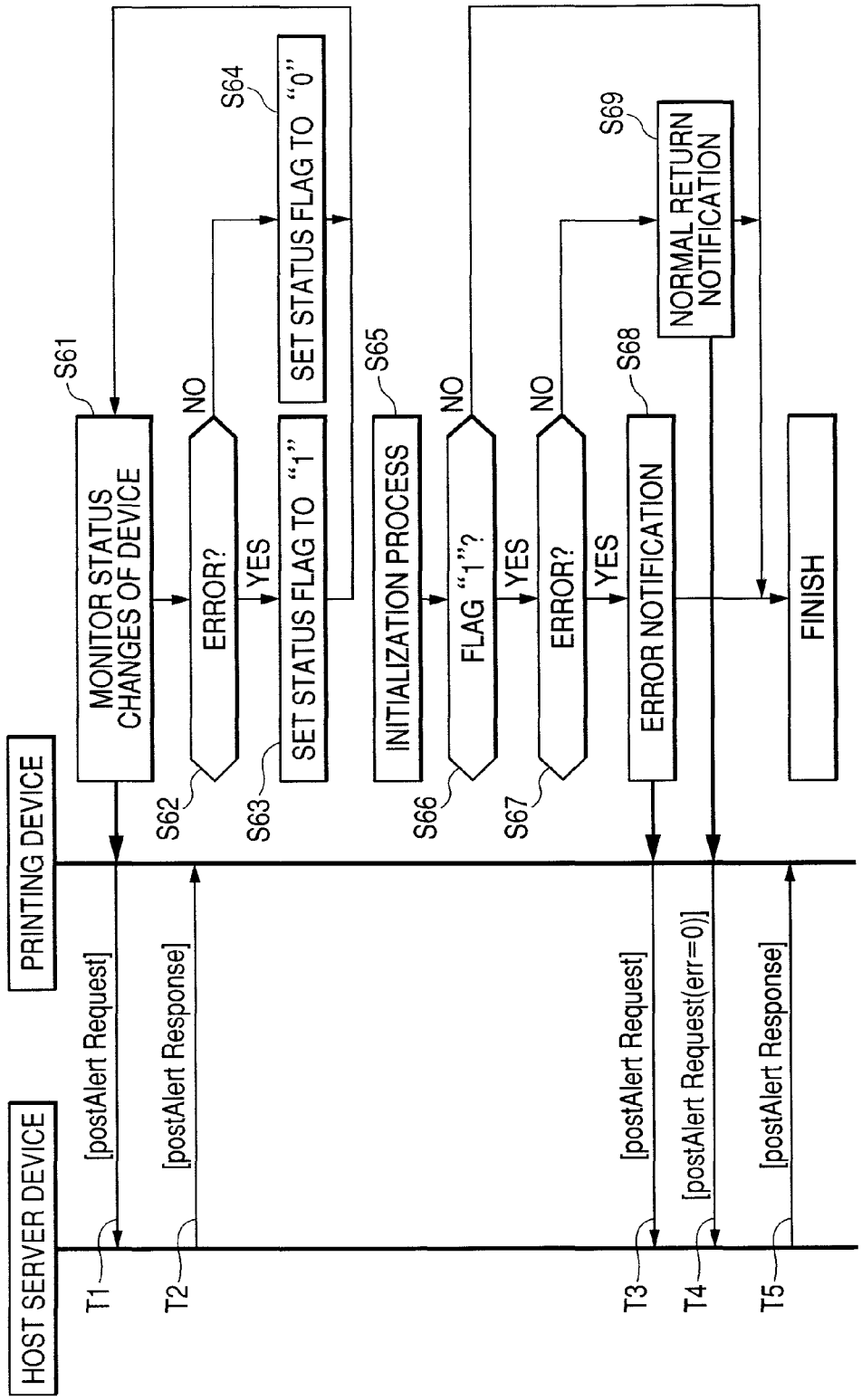
FIG. 3 is a flow diagram showing an operation of a printing device in accordance with an embodiment of the present invention.

A status flag referenced to in step S66 in FIG. 3 is stored in a nonvolatile storage means 706. The manager 704 checks this status flag (history) via a logic 705 upon power-on of the device following power-off.

When the status flag is "1" ("yes" in step S66), the manager 704 sends fixed information corresponding to a unique identifier of the own device along with the error information list which is variable information to a Simple Object Access Protocol (SOAP) function module 707.

In this case, fixed information includes, for instance, information (such as client ID or version of application) embedded in a client schema, and information embedded in a device schema (such as IP address, MAC address, device serial number, product name and product type), shown as reference numeral 401 in FIG. 4 and reference numeral 501 in FIG. 5.

The SOAP function module 707 requests a HTTP/SOAP client module 708 to create a markup language description based on the contents received from the manager 704 (fixed information and variable information), and to send the created markup language description to a designated server. Information regarding the designated server can either be retained in advance by the HTTP/SOAP client module 708, or included in the fixed information.

Upon receiving the variable information and the fixed information from the SOAP function module 707, the HTTP/SOAP client module 708 creates a markup language description based on the client schema and a markup language description based on the device schema, such as shown as reference numerals 401 and 501 in FIG. 4 and FIG. 5, and a markup language description based on an Alert schema (error list), shown as reference numerals 402, 403 and 502 in FIG. 4 and FIG. 5.

In this case, it is assumed that the schemas corresponding to each variable or fixed information are stored in advance in a storage section accessible by the HTTP/SOAP client module 708.

The HTTP/SOAP client module 708 then sends the created markup language description data to the designated server. The markup language may be, for instance, XML (eXtensible Markup Language).

A case where a status flag is "1" will now be described in detail.

When the status flag stored in the nonvolatile memory means 706 is "1", the manager 704 sends a query request regarding the status of the printer 16 to the device interface 701.

This status query request is made in order to determine whether any error has reoccurred. The device interface 701 can be configured so that it detects various states through sensors in response to a request and answers accordingly, or so that it responds to various states detected in advance.

Based on the response of the device interface 701, when any type of error is found to have occurred, the manager 704 sets the values of code and major status to code values of identified types as variable information, and sets the above-described information related to the own device as fixed information, and hands these information to the SOAP function module 707 (it is also conceivable to have the HTTP/SOAP client module 708 itself obtain the variable information and the fixed information from the SOAP function module 707). The values of the variable information and the fixed information are specified as to what the values represent, and then handed to the SOAP function module 707.

On the other hand, when no errors are found to have occurred based on the response of the device interface 701, the manager 704 sets the variable information so that it reflects that there are no errors (values of code and major status are "0"), and sets the above-described information related to the own device as fixed information, and hands these information to the SOAP function module 707. Again, the values of the variable information and the fixed information are specified as to what the values represent, and then handed to the SOAP function module 707.

The SOAP function module 707 requests the HTTP/SOAP client module 708 to create a schema-based markup language description based on the fixed information and variable information (including "0" as code and major status values) received from the manager 704, and to send the created markup language description to a designated server. Again, the values of the variable information and the fixed information are specified as to what the values represent, and then handed to the HTTP/SOAP client module 708.

Upon receiving the request, the HTTP/SOAP client module 708 determines what the values represent, reads in corresponding schemas, and based on the read schemas and delivered values, creates a markup language description based on the schemas as shown in FIG. 4 and FIG. 5.

Through the above process, the HTTP/SOAP client module 708 creates a markup language description based on the requested fixed information and variable information as well as the corresponding schemas. Thus, markup language description based on schemas embedded with identifiers of failures of types that have not occurred is not created, and markup language description based on schemas embedded with identifiers of failures of types that have been identified is created.

In addition, when status flags (history) are read upon activation and no occurrence of failures is identified, it is also possible to create a markup language description based on schemas embedded with identifiers indicating that no failures have occurred.

Meanwhile, at the host (an external system 710 in FIG. 7) side, transition of failures is managed based on an analysis of the markup language description notified by the HTTP/SOAP client module 708 via the gateway. In particular, when an identifier indicating that no failures have occurred is identified through analysis, as shown in FIG. 5, a recovery of a failure can be identified for failures that have been managed as occurred failures.

To be more precise, as the markup language descriptions shown in FIG. 4 and FIG. 5 are received, the error status of each device and each type is constantly updated. The updated error status is stored in the storage section.

Then, when an identifier (values of code and major status) corresponding to a type of failure that had occurred prior to the update is not included in the received markup language description and therefore is not confirmed, the failure type is identified as recovered. In particular, when receiving the markup language description data shown in FIG. 5, for instance all errors previously stored will be considered recovered and the host side device information will be updated as having a normal status. Thus, wasteful dispatching of service personnel and the like resulting from unrecovered error occurrences can be avoided.

Incidentally, while the above description provides that the SOAP function module 707 notifies HTTP/SOAP client module 708 of various information, the HTTP/SOAP client module 708 can be configured so that it voluntarily obtains the above-described fixed information and variable information from the SOAP function module 707.

The operation of the printing device 21 shown in FIG. 1 in the above configuration will now be described with reference to FIG. 3.

Incidentally, FIG. 3 is a flow diagram showing an operation of the printing device 21 in accordance with an embodiment of the present invention.

First, in step S61, the CPU 11 detects whether or not the status of the printer 16 has changed. The method of detection may be any method as long as the status of the printer can be identified, such as a method for detecting the values of various sensors, or a method for recognizing nonresponses.

When a status change has occurred at printer 16, and a service call error (for instance, types of errors which require repair by a service personnel, such as hard disk errors or pay counter errors) has occurred, the service call error information is sent to a host server device 27 using a packet shown in FIG. 4 below (T1). The response T2 from the host server device 27 in regards to this notification is a response packet shown in FIG. 6 below. In this case, the response is <result>OK</result>, meaning that the service call error information has been successfully received.

Additionally, when a service call error has been recovered, normal return information is sent to the host server device 27 using a packet shown in FIG. 5 below.

In the next step S62, the current status of the printer 16 is determined to be either in a state of service call error occurrence or a normal state. As a result of this determination, if the printer 16 is in a state of service call error occurrence, the routine proceeds to step S63, and if not, the routine proceeds to step S64. Meanwhile, errors such as door open that are not service call errors can also be determined as "yes" in step S62.

In step S63, the value "1" is written into a status flag memory area of a backup RAM 12a, and the routine returns to step S61. On the other hand, in step S64, the value "0" is written into the status flag memory area of the backup RAM 12a, and the routine returns to step S61.

Step S65 is the state continuing after a power off/on operation by a user. In step S65, the printer 21 executes an initialization process. In this case, "initialization process" means a process wherein a memory is initialized, read-in is performed from nonvolatile storage means of various control programs, and at the same time a switch indicating whether or not activation is necessary is referenced, and a schedule information indicating a URL or port of the host server device 27 and the transmission interval between the host server device 27 is referenced upon activation.

In the following step S66, the status flag stored as history in the backup RAM 12a is referenced, and if the status flag is "1", the routine proceeds to step S67, while a "0" terminates the present process. In other words, a "1" status flag indicates that the most recent status of the printing device at the time of its previous activation was a state of occurrence of a service call error (or other errors). When certain predetermined conditions are met upon conclusion of the processes of this flowchart, the printer 16 externally notifies its status. Regarding the predetermined conditions, various conditions can be assumed such as a case of arrival of a status notification timing according to a timer inside the device, a case where an accumulation of history of various or a specific status reaches a certain level or number, a case where a status requiring emergency notification has occurred, or a case where a status request is received from the host server device 27 or other external devices.

In step S67, it is determined whether a service call error (or other errors) is currently occurring. In other words, it is determined whether a service call error (or other errors) is still occurring upon the current activation. If a service call error (or other errors) is currently occurring, the routine proceeds to step S68, and if not, the routine proceeds to step S69.

In step S68, a service call error notification indicated by the packet shown in FIG. 4 is made (T3), thereby concluding this process.

On the other hand, in step S69, a normal return notification indicated by the packet shown in FIG. 5 below is made (T4) to the host server device 27, thereby concluding this process. For instance, while a most recent status of the printing device 21 at the time of the previous activation was in a state of service call error occurrence, since the service call error has been recovered upon the current re-activation, the recovered state is notified to the host server device 27.

Then, as a response to the normal return notification (T5), the response packet shown in FIG. 6 is returned. The response is, again, <result>OK</result>.

In addition, in response to receiving and identifying the response packet of FIG. 6, the printing device 21 clears the status flag referenced in step S66 of FIG. 3. By doing so, it will now become capable of obtaining a "no" result in the event that a re-examination is performed in step S66. This clearing process inhibits a normal return notification of a redundant step S69 when power-off is followed by power-on, thereby inhibiting increase of unnecessary traffic.

As described above, in the present embodiment, the most recent state regarding occurrences of service call errors (or other errors) at printer 16 (steps S61 and S62) is stored in the backup RAM 12a each time a status change occurs (steps S63 and S64), and when a user performs a power off/on operation and a printing device is re-activated (step S65), if a most recent status at the time of the previous activation was in a state of service call error occurrence or an occurrence of other errors (step S66), the current status of the printer 16 is then sent (steps S68 and S69).

This enables the host server device 27 side to be aware of the recovery of a service call error when the error is recovered by the user's power off/on operation.

In particular, while sending a current status to the host server device 27 side each time the printing device is re-activated due to the user's power off/on operation will result in increased traffic, the present embodiment provides step S66 wherein a current status is sent only when the most recent state at the time of the last activation was a state of occurrence of certain errors (service call error state), thereby efficiently notifying the host server device 27 of a recovery of a service call error without increasing traffic.

Incidentally, while the above description calls for an error notification to be made in step S68 as notification to the host server device 27 after re-activation due to a power off/on operation, such notification may be restricted to only a normal return notification in step S69, instead of performing the error notification in step S68. This will further inhibit traffic.

Additionally, in the above description, while the error at printer 16 which is a device was restricted to service call errors such as hard disk errors or pay counter errors, this may be applied to errors such as paper jams, or errors such as warnings for toner low or the like.

Packet data to be used for notification in the present embodiment will now be described.

Example of Packet Data for Error Notification

FIG. 4 is a diagram showing an example of a packet data of a markup language sent upon error notification (T1 and T3 in FIG. 3) in accordance with the present embodiment. The packet data description is based on a schema. The packet data is an example of a packet data which uses SOAP (Simple Object Access Protocol) over HTTP and is sent from the printing device 21 to the host server device 27 in order to notify error (referred to as em_postAlert).

This data is written in XML (eXtensible Markup Language) format. Obviously, applicable format is not restricted to XML. For instance, HTML (Hyper Text Transfer Protocol) may be used instead. The postAlert packet is a command which notifies error information to the host server device 27 when an error occurs at the printer 16, and contains information such as the packet source shown in FIG. 4 which indicates fixed information, client information (<client> tag) which indicates the device that is the source of the error, or an alert information list (<alertList> tag) which indicates variable information. The <client> tag includes <id> which identifies a client, <type> which identifies the type of a client, and <appVersion> which identifies the version of an application. In addition, the alertList includes a <device> list which identifies a device, an <alert> list, as well as counter information <counterList>.

Furthermore, in <device>, as fixed information, <mac> which identifies the lower 4 bytes of a MAC address which is the destination of the packet, <ip> which identifies an IP address, serial number <serialNumber>, product name <productName> and type <type> are respectively described. Meanwhile, in <alert>, an error code <code>, its major division <major status>, textual information indicating the error <opmessage>, and time stamp information <timestamp> are respectively described.

In the <counterList>, a service mode number <id> and <value>, which is a counter value designated by the service mode number, are respectively described.

Incidentally, in the above description of FIG. 4, "client" refers to devices such as printers.

Example of Packet Data for Normal Return Notification

FIG. 5 is a diagram showing an example of a packet data sent upon notification of normal return of error (T4 in FIG. 3) in accordance with the present embodiment. In the same way as FIG. 4, the description of this packet data is also based on a schema. The packet data is an example of a packet data which uses SOAP over HTTP and is sent from the printing device 21 to the host server device 27 in order to notify normal return (referred to as em_postAlert).

While the same schema as the packet data shown in FIG. 4 is used, in <alert>, error code <code> and major division <majorstatus> are both set to "0" while textual information indicating error <opmessage> is set to "NULL". By setting <alert> in this manner, this packet indicates that an error has been recovered.

Additionally, since a device can be specified by <mac> which identifies the lower 4 bytes of a MAC address which is the destination of the packet, <ip> which identifies an IP address, and serial number <serialNumber>, respectively included in the <device> tag shown in FIG. 4, it is possible to specify the device where an error was recovered.

Furthermore, while em_post Alert is used as a schema to notify recovery of an error, other SOAP functions may be used instead.

In this manner, since a notification of a normal return from an error as shown in FIG. 5 can be performed using the same alert schema (<alert>) as in FIG. 4, the notification format can be simplified. As a result, processing at the host server device 27 side which receives the notification can be made more efficient.

For example, a schema indicating a notification of a normal return from an error can be provided separately from the alert schema. However, as a preferred embodiment, the present embodiment calls for an alert schema 502 to be first analyzed at the host server device 27 side, and a value described by the same <majorstatus> schema as 402 in FIG. 4 to be identified as "0", thereby determining recovery of a service call error. As a result, schema determination processing at the host server device 27 side can be alleviated.

Example of a Response to a Notification

FIG. 6 is a diagram showing a response to an error notification (FIG. 4) or a normal return notification (FIG. 5) in accordance with the present embodiment, and is written based on a schema in the same manner as FIG. 4 and FIG. 5.

This data is also written in XML format in the same manner as the packet data in FIG. 5, and in the present embodiment, is sent/received using SOAP over HTTP. In an em_postAlert response packet, "OK" or "NG" is described as a result information <return> in response to the em_postAlert command, and then returned.

Other Embodiments

The above-described first embodiment is configured so that the printing device is provided with a function to notify status to the host server device 27. However, other configurations wherein the printing device sends notification to the host server device 27 via a device monitoring device is also possible.

This device monitoring device monitors the status and counter values of one or a plurality of printing devices, and notifies the host server device 27 of the status and counter values of the printing devices either voluntarily or in response to a request from the host server device 27.

In addition, while the host server device 27 is described as being one device in FIG. 2, the present invention is not restricted to this configuration. A host server system comprising a plurality of devices can be used to achieve the same function as the host server device 27.

The present invention is not restricted to the device according to the above-described embodiment, and can be applied to systems comprising a plurality of devices, as well as to an apparatus consisting of a single device. It is needless to say that the present invention can also be realized by supplying a system or a device with a storage media storing a program code of a software capable of achieving the function of the above-described embodiment, and having a computer (or a CPU or MPU) of the system or device read out and execute the program code stored in the storage media.

In this case, the program code itself, read out from the storage media, achieves the function of the above-described embodiment, and the storage media storing the program code constitutes the present invention. Storage media which can be used to supply the program code include, for instance, a floppy (registered trademark) disk, a hard disk, an optical disk, a magnetic optical disk, a CDROM, a CDR, a magnetic tape, a nonvolatile memory card, and a nonvolatile memory. It is needless to say that the present invention also includes cases wherein executing the program code read by a computer not only realizes the function of the above-described embodiment, but an OS or the like running on the computer performs either a portion or the entirety of the actual processing based on instructions of the program code, and such processing realizes the function of the above-described embodiment.

Furthermore, it is needless to say that the present invention also includes cases wherein a program code is first written onto either a function expansion board inserted into the computer or a function expansion unit connected to the computer, and a CPU or the like provided on the expansion board or expansion unit performs the expanded functions to carry out either a portion or the entirety of the actual processing based on instructions of the program code, and such processing realizes the function of the above-described embodiment.

This application claims priority from Japanese Patent Application Nos. 2004-231243 filed on Aug. 6, 2004 and 2005-164585 filed on Jun. 3, 2005, which are hereby incorporated by reference herein.

What is claimed is:

1. An information processing apparatus comprising:
a communication unit adapted to communicate with an external apparatus;
a determination unit adapted to, upon activation of an image forming apparatus, determine whether or not a history of a failure occurrence detected in the image forming apparatus and sent to the external apparatus via the communication unit is stored in a storage unit provided in the image forming apparatus and whether the image forming apparatus has a normal status, wherein the storage unit is configured such that stored contents are not deleted by an initialization process executed upon activation of the image forming apparatus; and
a control unit adapted to control said communication unit to send a normal return notification to the external apparatus when said determination unit determines that the history of the failure occurrence is stored in the storage unit and the image forming apparatus is in the normal status upon activation of the image forming apparatus, wherein the normal return notification is described by a markup language description and indicates that the failure sent to the external apparatus via the communication unit has been recovered in the image forming apparatus, and wherein the normal return notification is sent to the external apparatus without a request from the external apparatus upon activation of the image forming apparatus.

2. An information processing apparatus according to claim 1, further comprising:
a reception unit adapted to receive, from the external apparatus, a response based on the normal return notification, and
a deletion unit adapted to delete the history of the failure occurrence stored in the storage unit, in accordance with the reception of said response by the reception unit.

3. An information processing apparatus according to claim 1, wherein the failure occurrence indicates a service call error.

4. An information processing apparatus according to claim 1, wherein the information processing apparatus is embedded in the image forming apparatus.

5. An information processing apparatus comprising:
a communication unit adapted to communicate with an external apparatus;
a determination unit adapted to, upon activation of an image forming apparatus, determine whether or not a history of a failure occurrence detected in the image forming apparatus is stored in a storage unit provided in the image forming apparatus, wherein the storage unit is configured such that stored contents are not deleted by an initialization process executed upon activation of the image forming apparatus;
a detection unit adapted to detect failure upon activation of the image forming apparatus; and
a control unit adapted to control said communication unit to send a normal return notification to the external apparatus when said determination unit determines that the history of the failure occurrence is stored in the storage unit and the image forming apparatus is in the normal status upon activation of the image forming apparatus,
wherein the normal return notification is described by a markup language description and indicates that the failure sent to the external apparatus via the communication unit has been recovered in the image forming apparatus,
wherein said control unit controls said communication unit to send a particular notification to the external apparatus when said determination unit determines that the history of the failure occurrence is stored in the storage unit and the detection unit detects failure upon activation of the image forming apparatus, and
wherein the particular notification is described by a markup language description based on a schema embedded with an identifier of a type of the failure detected by the detection unit.

6. An information processing apparatus comprising:
a communication unit adapted to communicate with an external apparatus;
a determination unit adapted to, upon activation of an image forming apparatus, determine whether or not a history of a failure occurrence detected in the image forming apparatus is stored in a storage unit provided in the image forming apparatus, wherein the storage unit is configured such that stored contents are not deleted by an initialization process executed upon activation of the image forming apparatus;
a detection unit adapted to detect failure upon activation of the image forming apparatus; and
a control unit adapted to control said communication unit to send a normal return notification to the external apparatus when said determination unit determines that the history of the failure occurrence is stored in the storage unit and said detection unit does not detect the failure upon activation of the image forming apparatus,
wherein the normal return notification indicates that the failure sent to the external apparatus via the communication unit has been recovered in the image forming apparatus,
wherein said control unit controls said communication unit to send a particular notification to the external apparatus when said determination unit determines that the history of the failure occurrence is stored in the storage unit and said detection unit detects the failure upon activation of the image forming apparatus, and
wherein the particular notification indicates a type of the failure detected by said detection unit.

7. An information notification method carried out in an information processing apparatus having a communication unit adapted to communicate with an external apparatus, the method comprising:
determining, upon activation of an image forming apparatus, whether or not a history of a failure occurrence detected in the image forming apparatus and sent to the external apparatus via the communication unit is stored in a storage unit provided in the image forming apparatus and whether the image forming apparatus has a normal status, wherein the storage unit is configured such that stored contents are not deleted by an initialization process executed upon activation of the image forming apparatus; and
controlling a communication unit to send a normal return notification to the external apparatus when the determining determines that the history of the failure occurrence is stored in the storage unit and the image forming apparatus is in the normal status upon activation of the image forming apparatus,
wherein the normal return notification is described by a markup language description and indicates that the failure sent to the external apparatus via the communication unit has been recovered in the image forming apparatus, and
wherein the normal return notification is sent to the external apparatus without a request from the external apparatus upon activation of the image forming apparatus.

8. An information notification method carried out in an information processing apparatus, the method comprising:
determining, upon activation of an image forming apparatus, whether or not a history of a failure occurrence detected in the image forming apparatus is stored in a storage unit provided in the image forming apparatus and whether the image forming apparatus has a normal status or a failure, wherein the storage unit is configured such that stored contents are not deleted by an initialization process executed upon activation of the image forming apparatus;
controlling a communication unit to send a normal return notification to an external apparatus when the determining determines that the history of the failure occurrence is stored in the storage unit and the image forming apparatus is in the normal status upon activation of the image forming apparatus; and
controlling the communication unit to send a particular notification to the external apparatus when the determining determines that the history of the failure occurrence is stored in the storage unit and the image forming apparatus has the failure upon activation of the image forming apparatus, wherein the normal return notification is described by a markup language description and indicates that the failure sent to the external apparatus via the communication unit has been recovered in the image forming apparatus, and wherein the particular notification is described by a markup language description based on a schema embedded with an identifier of a type of the failure.

9. An information notification method carried out in an information processing apparatus, the method comprising:

determining, upon activation of an image forming apparatus, whether or not a history of a failure occurrence detected in the image forming apparatus is stored in a storage unit provided in the image forming apparatus and whether the image forming apparatus has a failure, wherein the storage unit is configured such that stored contents are not deleted by an initialization process executed upon activation of the image forming apparatus;

controlling a communication unit to send a normal return notification to an external apparatus when the determining determines that the history of the failure occurrence is stored in the storage unit and the image forming apparatus does not have the failure upon activation of the image forming apparatus, wherein the normal return notification indicates that the failure sent to the external apparatus via the communication unit has been recovered in the image forming apparatus; and controlling the communication unit to send a particular notification to the external apparatus when the determining determines that the history of the failure occurrence is stored in the storage unit and the image forming apparatus has the failure upon activation of the image forming apparatus, wherein the particular notification indicates a type of the failure.

10. A non-transitory computer-accessible data storage medium storing computer instructions configured to cause a computer system to implement an information notification method in an image forming apparatus having a communication unit adapted to communicate with an external apparatus, wherein the computer instructions comprise:

instructions for determining, upon activation of the image forming apparatus, whether or not a history of a failure occurrence detected in the image forming apparatus and sent to the external apparatus via the communication unit is stored in a storage unit provided in the image forming apparatus and whether the image forming apparatus has a normal status, wherein the storage unit is configured such that stored contents are not deleted by an initialization process executed upon activation of the image forming apparatus; and instructions for controlling the communication unit to send a normal return notification to the external apparatus when the history of the failure occurrence is determined to be stored in the storage unit and the image forming apparatus is in the normal status upon activation of the image forming apparatus, wherein the normal return notification is described by a markup language description and indicates that the failure sent to the external apparatus via the communication unit has been recovered in the image forming apparatus, and wherein the normal return notification is sent to the external apparatus without a request from the external apparatus upon activation of the image forming apparatus.

11. A non-transitory computer-accessible data storage medium storing computer instructions configured to cause a computer system to implement an information notification method, wherein the computer instructions comprise:

instructions for determining, upon activation of an image forming apparatus, whether or not a history of a failure occurrence detected in the image forming apparatus is stored in a storage unit provided in the image forming apparatus and whether the image forming apparatus has a normal status or a failure, wherein the storage unit is configured such that stored contents are not deleted by an initialization process executed upon activation of the image forming apparatus;

instructions for controlling a communication unit to send a normal return notification to an external apparatus when the determining determines that the history of the failure occurrence is stored in the storage unit and the image forming apparatus is in the normal status upon activation of the image forming apparatus; and instructions for controlling the communication unit to send a particular notification to the external apparatus when the determining determines that the history of the failure occurrence is stored in the storage unit and the image forming apparatus has the failure upon activation of the image forming apparatus, wherein the normal return notification is described by a markup language description and indicates that the failure sent to the external apparatus via the communication unit has been recovered in the image forming apparatus, and wherein the particular notification is described by a markup language description based on a schema embedded with an identifier of a type of the failure.

12. A non-transitory computer-accessible data storage medium storing computer instructions configured to cause a computer system to implement an information notification method, wherein the computer instructions comprise:

instructions for determining, upon activation of an image forming apparatus, whether or not a history of a failure occurrence detected in the image forming apparatus is stored in a storage unit provided in the image forming apparatus and whether the image forming apparatus has a failure, wherein the storage unit is configured such that stored contents are not deleted by an initialization process executed upon activation of the image forming apparatus;

instructions for controlling a communication unit to send a normal return notification to an external apparatus when the determining determines that the history of the failure occurrence is stored in the storage unit and the image forming apparatus does not have the failure upon activation of the image forming apparatus, wherein the normal return notification indicates that the failure sent to the external apparatus via the communication unit has been recovered in the image forming apparatus; and instructions for controlling the communication unit to send a particular notification to the external apparatus when the determining determines that the history of the failure occurrence is stored in the storage unit and the image forming apparatus has the failure upon activation of the image forming apparatus, wherein the particular notification indicates a type of the failure.

* * * * *